United States Patent
Downing et al.

(10) Patent No.: US 7,817,798 B2
(45) Date of Patent: Oct. 19, 2010

(54) COMPACT BEAMFORMING MICROPHONE ASSEMBLY

(75) Inventors: Mike Downing, Mountain View, CA (US); Robert Jetter, Pleasanton, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 86 days.

(21) Appl. No.: 12/246,996

(22) Filed: Oct. 7, 2008

(65) Prior Publication Data
US 2010/0086124 A1   Apr. 8, 2010

(51) Int. Cl.
*H04M 1/00* (2006.01)
*H04M 9/00* (2006.01)
*H04R 9/08* (2006.01)

(52) U.S. Cl. .................... 379/433.03; 381/355

(58) Field of Classification Search ........... 379/419, 379/433.03; 381/360, 369, 361, 355, 356, 381/359; 181/171, 158, 166; 455/575.1
See application file for complete search history.

(56) References Cited

U.S. PATENT DOCUMENTS

| | | | |
|---|---|---|---|
| 6,826,284 | B1 | 11/2004 | Benesty et al. |
| 2007/0263845 | A1 | 11/2007 | Hodges et al. |
| 2008/0159575 | A1 | 7/2008 | Chu et al. |

OTHER PUBLICATIONS

International Search Report Application No. PCT/US2009/058234 mailed on Nov. 17, 2009; 2 pages.
Written Opinion Application No. PCT/US2009/058234 mailed on Nov. 17, 2009; 7 pages.

*Primary Examiner*—Tuan D Nguyen
(74) *Attorney, Agent, or Firm*—Townsend and Townsend and Crew LLP

(57) ABSTRACT

A compact low cost beamforming microphone assembly for a desk telephone is described. The assembly includes a microphone carrier array having a top surface and having faces arrayed about an exterior surface, each to receive a microphone. Each microphone is mounted in a microphone boot and inserted into a microphone carrier. The carrier array fits into a housing having a cover allowing sound to reach the microphones.

23 Claims, 2 Drawing Sheets

COMPACT BEAMFORMING MICROPHONE ASSEMBLY

BACKGROUND OF THE INVENTION

Beamforming is a signal processing technique used in sensor arrays, for example arrays of microphones, for directional signal reception and appropriate signal processing of the received acoustical signals. Beamforming allows an assembly of microphones receiving acoustical signals to have the resulting electrical signals selectively processed, for example, treating acoustical information from one source differently than acoustical information from a different source. In contrast to omni-directional microphone assemblies which receive and process sounds uniformly regardless of source or direction, beamforming allows signals arriving from different locations to be treated differently before transmission or amplification. Beamforming allows detection of particular signals of interest by use of special filtering and interference rejection.

One potential application of beamforming microphones is in conference telephony. In conference telephony individuals may be arrayed about a room at different locations and distances from a conference telephone. The voices of some individuals may reach the microphone directly, while voices from other individuals further from the microphone may reach the microphone directly and via multiple other paths, such as by reflections off walls or windows in the room. In addition, there may be background noise originating from sources outside the room. With the use of advanced signal processing techniques, individual voices within the room may be selected and selectively processed or amplified before transmission to other parties participating in the telephone call. Background noises may be suppressed, and the relative volumes of voices equalized before transmission. A more detailed discussion of beamforming is in "A Primer on Digital Beamforming," T. Haynes, Spectrum Signal Processing, Mar. 26, 1988 (www.spectrumsignal.com).

One disadvantage of conventional beamforming microphone arrays is their size. Typically such arrays require a relatively large footprint, often about a foot square, as typified by conventional conference room telephones. A further disadvantage of conventional beamforming microphone arrays has been the cost. Conventional conference telephones cost hundreds of dollars, precluding their use in many applications where they would be otherwise suitable. Accordingly, there is a need for a compact, low-cost, beamforming microphone array, for example as might be used with a conventional desk or office telephone.

BRIEF SUMMARY OF THE INVENTION

This invention relates to beamforming microphone arrays, and in particular to a compact, low cost beamforming microphone array. In one implementation, a beamforming microphone array includes a microphone array carrier having a top surface and having a set of faces arrayed about an exterior surface of the microphone array carrier. Each one of a set of miniature microphones is mounted in a separate microphone boot. The microphone/microphone boot is inserted into a microphone array carrier. The resulting assembly is thus only less than two inches across.

The microphone array carrier itself mounts into a housing, and is covered by a mesh top which allows sound to reach the microphones from outside the housing. Compliant sound sealing or isolating material is disposed to acoustically isolate the microphone array carrier from the housing and to acoustically isolate each of the microphones from the microphone array carrier.

In another implementation a desk telephone is provided with a beamforming microphone array as described above. The small size of the array allows it to be provided as an integral part of the telephone without significantly increasing the cost of the telephone or the footprint of the telephone on a user's desk.

DETAILED DESCRIPTION OF THE INVENTION

Figure 1:
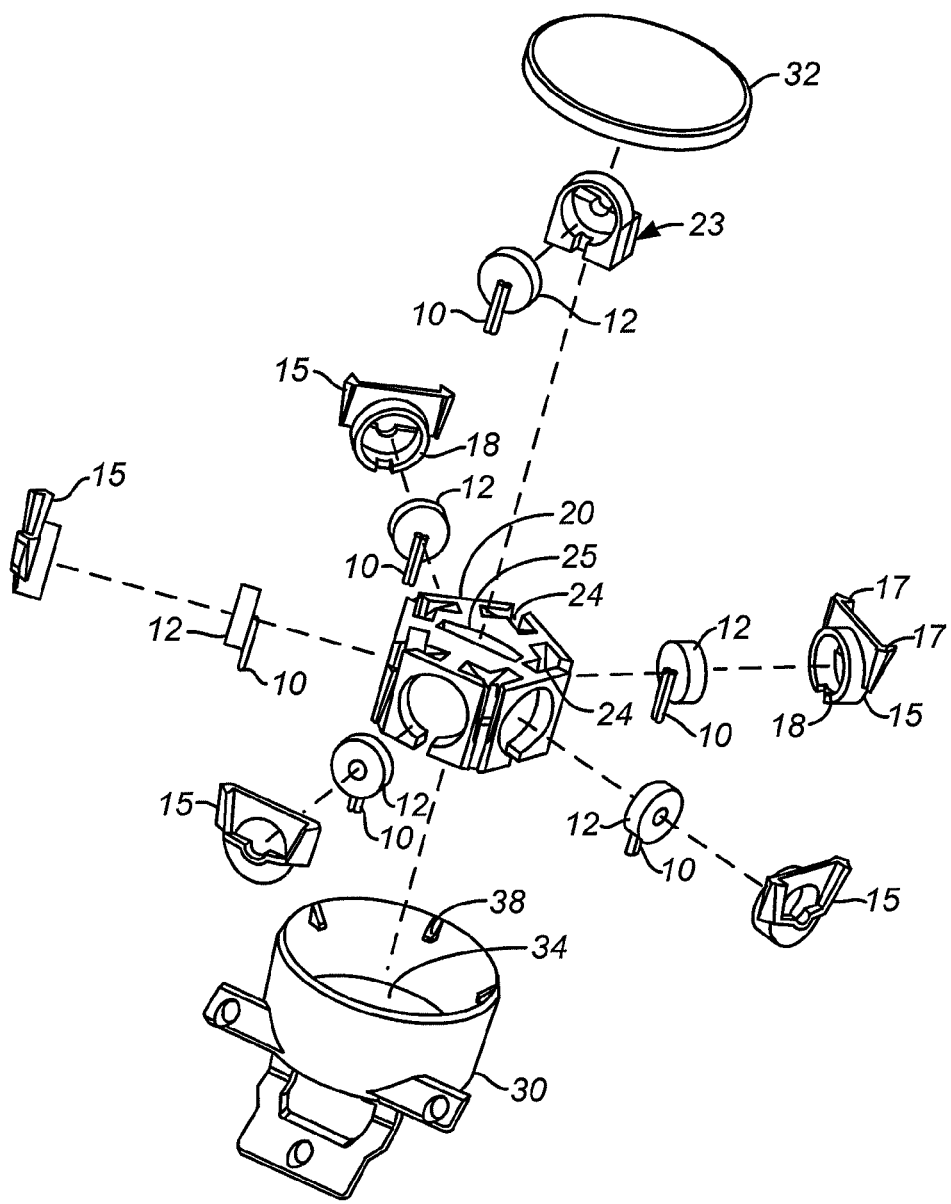
FIG. 1 is an exploded view of a beamforming microphone assembly.

FIG. 1 illustrates the beamforming microphone assembly of this invention in a preferred implementation. The assembly includes six miniature microphones 10, typically microphones such as are available from, for example, MWM Acoustics of Indianapolis, Ind. Each disk-shaped microphone 12 with electrical connector 10 is formed in a small assembly with the sensor portion of the microphone 12 exposed through an opening in the center of the disk. Each microphone assembly fits into a microphone boot 15, preferably rubber or another acoustically opaque compliant material to isolate the microphone from the microphone carrier—as discussed next.

The individual microphone boots 15 then fit into a plastic microphone array carrier 20 which provides a mount for all of the microphone boots 15. Care is taken to seal against potential acoustical leaks from one microphone to the next. To facilitate this, crush ribs 17 are used to seal the microphone boot 15 against the exterior housing 30. In addition, an acoustic seal is made diametrically around the microphone 10 and diametrically from the boot 15 to the carrier 20. This achieved from a press fit of the microphone 12 into the rubber boot on surfaces 18. Although not essential, best performance is achieved by isolating the microphones from all surrounding hard materials to reduce transmission of vibration.

In the assembly depicted, five microphones are arrayed in a pentagonal orientation around the periphery of the microphone array carrier 20. In this arrangement the five outside microphones can use the same design boot, instead of needing a different boot for each microphone. This reduction in unique parts reduces cost of the final assembly. A sixth microphone assembly 23 slides into a central portion 25 of microphone array carrier 20 through an opening in the bottom (not shown) of the array carrier. This microphone assembly 23, when inserted into microphone carrier 20, is angled forward and upward to also detect sounds arriving from a direction perpendicular to the pentagonal orientation of the faces of the microphone array carrier 20. Assembly 23, however, does not face directly upward, but rather is canted to face the front of the assembly, as this is the expected direction of at least one of the likely individuals using the beamforming microphone assembly, that is, the user of a desktop telephone to which the beamforming microphone assembly will be affixed. The central microphone 23 with boot is tilted in microphone array carrier 20, rather than being mounted face up, thereby also reducing the overall dimensions of the assembly. The geometry of the opening in the carrier 20 matches the geometry of the ports formed between each microphone boot 15 and the exterior housing 30 when assembled.

The microphone array carrier 20, with all microphone assemblies correctly positioned, fits into a housing 30 which is adapted to be coupled to a desk telephone, as will be described. Housing 30 typically will be plastic, e.g. of the same type and color as the telephone to which it is attached. The design of the carrier and housing are done so that the central carrier can only be installed in the correct orientation. This causes the same microphone always points the same direction when installed onto the desk telephone. This can be accomplished with snaps or other guiding features 38.

A mesh cover 32 covers the top of the exterior housing surrounding the microphone array carrier 30, enabling sound to reach the microphones while improving the aesthetics of the finished product. The mesh cover also prevents debris or small objects from falling into the microphone ports. The completed assembly of microphones, microphone boots, and the carrier array is isolated from the exterior housing 30 by the crush ribs on the individual microphone boots 17. When completed, the assembly depicted in FIG. 1 is approximately 1.5 inches in diameter and one inch in height.

Figure 2:
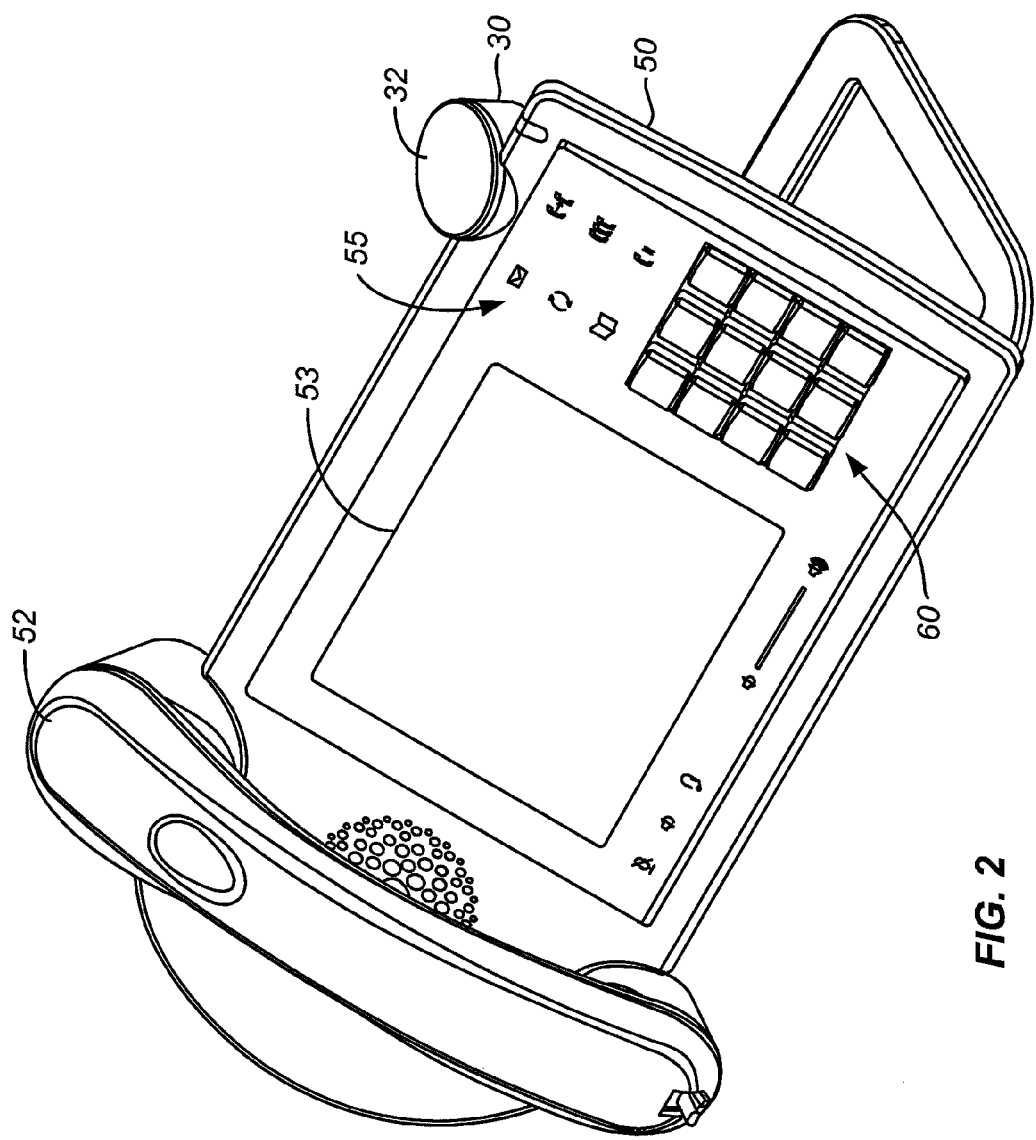
FIG. 2 is a diagram of the apparatus shown in FIG. 1 in place on an office telephone.

FIG. 2 is a perspective view of a typical desk telephone 50 for use in an office, home or other location. The illustration is of a ShoreTel (the assignee of this application) VOiP telephone 50 and includes a handset 52, a display screen 53, various feature choices indicators 55, and a keypad 60. As illustrated in FIG. 2, the beamforming microphone assembly contained within housing 30 beneath cover 32 occupies only a very small portion of telephone 50 itself, fitting easily within the available footprint of the telephone. In this manner, conference telephony capability is provided for a conventional desk telephone without need of a separate system. Placing the microphone assembly on an upper surface of the desk telephone also places it farther away from distracting sounds of rustling papers. In addition, having one of the microphones oriented to receive sounds from above the telephone, as depicted in FIG. 1, helps in sound processing by enabling easier removal of reflected sounds.

Processing of the sound from the microphone array is performed using well known signal processing techniques implemented in commercially available integrated circuits. One such implementation uses the signal processing techniques described in U.S. Pat. No. 6,826,284, entitled, "Method and Apparatus for Passive Acoustic Source Localization for Video Camera Steering Applications." That patent describes a real-time passive acoustic source localization system for video camera steering. The system described therein operates by determining the relative delay between the direct paths of two estimated channel impulse responses. Using a specialized algorithm, the system makes a determination of the acoustic source location. The sound from that location then may be further processed as desired.

The beamforming microphone assembly described herein enables the directional sound processing, suppression of background noise, and equalization of volume from the voices of many different individuals arrayed around the telephone 50. It enables individuals participating in a call to move about the room, yet have their voices continue to be presented to a listener with clarity and appropriate volume.

Although the preferred embodiments of the invention have been described above, it will be appreciated that various modifications may be made to the beamforming microphone assembly described without departing from the scope of the invention. For example, in the embodiment illustrated, six microphones have been employed. If differing degrees of precision of sound location and equalization are desired, more or fewer microphones may be employed. In addition, the microphone assembly may be adapted to be used in conjunction with other types or styles of telephones than the one illustrated, or implemented as stand-alone apparatus separate from the telephone. for example, the microphone assembly can be used to provide portable conference calling capability by forming it as a discrete unit and then coupling it to a cellular telephone. This coupling can use a wired connection to a jack or USB port on the cellular telephone, or by a wireless connection, for example, using Bluetooth technology.

What is claimed is:

1. A beamforming microphone assembly comprising:
a microphone array carrier having a top surface and having a first plurality of adjacent side faces arrayed about an exterior surface of the microphone array carrier, the top surface and each of the side faces being substantially planar and each of the side faces extending substantially perpendicular to the top surface;
a corresponding first plurality of microphones, each microphone being mounted in a microphone boot, each microphone boot being adapted to be mounted in a side opening extending through a corresponding one of the side faces of the microphone array carrier;
a housing for receiving the microphone array carrier and the microphones;
sound isolating material disposed to acoustically isolate the microphone boots from the housing and to acoustically isolate the microphones from the microphone array carrier; and
a cover for confining the microphone array carrier and the microphones within the housing, the cover allowing sound to reach the microphones from outside the housing and the cover.

2. An assembly as in claim 1 wherein:
the microphone array carrier includes an opening to the top surface; and
an additional microphone and microphone boot are mounted inside the microphone array carrier with the microphone exposed by the opening to sound arriving at the top surface.

3. An assembly as in claim 2 wherein:
the first plurality is five; and
the five microphones are arranged in a pentagonal orientation about the exterior of the microphone array carrier.

4. An assembly as in claim 2 wherein:
each of the microphones is mounted in a microphone boot shaped member; and
the microphone array carrier includes a series of microphone boot shaped openings about its periphery to receive the microphone boot shaped members.

5. An assembly as in claim 4 wherein the additional microphone and microphone boot are substantially identical to the first plurality of microphones and microphone carriers.

6. An assembly as in claim 5 wherein:
the microphone array carrier includes a canted slot in its top surface; and
the additional microphone and microphone boot are positioned in the slot.

7. An assembly as in claim 6 wherein the slot causes the additional microphone to be canted upward toward the cover, and wherein the additional microphone has an acoustical port substantially identical to each of the first plurality of microphones.

8. An assembly as in claim 1 wherein the assembly is attached to a desk telephone having a keypad.

9. An assembly as in claim 8 wherein the cover is no larger than the keypad.

10. An assembly as in claim 1 wherein each of the microphones is coupled to an electronic acoustic source localization system.

11. An assembly as in claim 1 further including an electrical signal connecting means for electrically communicating information between the assembly and at least one of a desk telephone and a cellular telephone.

12. A desk telephone comprising:
a handset;
a keypad disposed on a front of the desk telephone for entering numbers; and
a beamforming microphone assembly including:
a microphone array carrier having a top surface and having a first plurality of adjacent side faces arrayed about an exterior surface of the microphone array carrier, the top surface and each of the side faces being substantially planar and each of the side faces extending substantially perpendicular to the top surface;
a corresponding first plurality of microphones, each microphone being mounted in a microphone boot, each microphone boot being adapted to be mounted in a side opening extending through a corresponding one of the side faces of the microphone array carrier;
a housing attached to an exterior surface of the desk telephone for receiving the microphone array carrier and the microphones;
sound isolating material disposed to acoustically isolate the microphone array carrier from the housing and to acoustically isolate the microphones from the microphone array carrier; and
a cover for confining the microphone array carrier and the microphones within the housing, the cover allowing sound to reach the microphones from outside the housing and the cover.

13. A desk telephone as in claim 12 wherein:
the microphone array carrier includes an opening to the top surface; and
an additional microphone and microphone boot are mounted inside the microphone array carrier with the microphone exposed by the opening to sound arriving at the top surface.

14. A desk telephone as in claim 13 wherein:
the first plurality is five; and
the five microphones are arranged in a pentagonal orientation about the exterior of the microphone array carrier.

15. A desk telephone as in claim 14 wherein:
each of the microphones is mounted in a microphone boot shaped member; and
the microphone array carrier includes a series of microphone boot shaped openings about its periphery to receive the microphone boot shaped members.

16. A desk telephone as in claim 15 wherein:
the microphone array carrier includes a slot in its top surface; and
the additional microphone and microphone boot are positioned in the slot.

17. A desk telephone as in claim 12 wherein the beamforming microphone assembly is attached to an upper surface of the desk telephone.

18. A desk telephone as in claim 17 wherein the cover is no larger than the keypad.

19. A desk telephone as in claim 16 wherein each of the microphones is coupled to an electronic acoustic source localization system.

20. A desk telephone as in claim 16 wherein the additional microphone is oriented upward to detect sounds arriving from a direction substantially perpendicular to the side faces of the microphone array carrier and oriented forward to detect sounds arriving from a direction substantially in the front of the desk telephone.

21. A desk telephone as in claim 12 wherein the beamforming microphone assembly has a diameter of approximately 1.5 inches and a height of approximately 1.0 inch.

22. An assembly as in claim 1 wherein the assembly has a diameter of approximately 1.5 inches and a height of approximately 1.0 inch.

23. An assembly as in claim 1 wherein the housing includes a guide adapted to orient the microphone array carrier relative to the housing.

* * * * *